United States Patent
Mazur

[11] Patent Number: 5,909,502
[45] Date of Patent: Jun. 1, 1999

[54] SOFTWARE LOADING SYSTEM FOR A CURRENCY SCANNER

[75] Inventor: Richard A. Mazur, Naperville, Ill.

[73] Assignee: Cummins-Allison Corp., Mt. Prospect, Ill.

[21] Appl. No.: 08/715,029

[22] Filed: Sep. 17, 1996

[51] Int. Cl.[6] .............................. G06K 9/00; G06F 13/00; G06F 12/02
[52] U.S. Cl. ........................ 382/135; 382/305; 365/52; 395/282; 395/651; 395/712; 711/103
[58] Field of Search .................................... 382/100, 305, 382/135; 365/52, 185.04; 395/828, 500, 200.5, 200.51, 200.52, 282, 283, 712, 651, 652, 653; 364/464.17; 711/103

[56] References Cited

U.S. PATENT DOCUMENTS

| | | | |
|---|---|---|---|
| D. 369,984 | 5/1996 | Larsen | D10/97 |
| 4,789,345 | 12/1988 | Carter | 439/71 |
| 5,066,992 | 11/1991 | Wu et al. | 357/23.5 |
| 5,163,672 | 11/1992 | Mennie | 271/187 |
| 5,207,788 | 5/1993 | Geib et al. | 271/122 |
| 5,239,621 | 8/1993 | Brown, III et al. | 395/115 |
| 5,256,080 | 10/1993 | Bright | 439/342 |
| 5,295,196 | 3/1994 | Raterman et al. | 382/7 |
| 5,342,213 | 8/1994 | Kobayashi | 439/268 |
| 5,388,248 | 2/1995 | Robinson et al. | 395/425 |
| 5,454,727 | 10/1995 | Hsu | 439/263 |
| 5,457,336 | 10/1995 | Fang et al. | 257/322 |
| 5,467,405 | 11/1995 | Raterman et al. | 382/135 |
| 5,467,406 | 11/1995 | Graves et al. | 382/135 |
| 5,473,765 | 12/1995 | Gibbons et al. | 395/500 |
| 5,493,534 | 2/1996 | Mok | 356/226 |
| 5,504,701 | 4/1996 | Takahashi et al. | 365/185.04 |
| 5,542,468 | 8/1996 | Lin | 165/80.3 |
| 5,603,056 | 2/1997 | Totani | 395/828 |
| 5,615,120 | 3/1997 | Schwartz et al. | 364/464.17 |
| 5,633,949 | 5/1997 | Graves et al. | 382/135 |
| 5,663,901 | 9/1997 | Wallace et al. | 365/52 |
| 5,860,157 | 1/1999 | Cobb | 711/103 |

FOREIGN PATENT DOCUMENTS

| | | | |
|---|---|---|---|
| 690451 | 1/1996 | European Pat. Off. | G11C 16/06 |
| 700098 | 3/1996 | European Pat. Off. | H01L 29/788 |
| 4310216 | 9/1994 | Germany | G09G 3/00 |
| WO 91/11778 | 8/1991 | WIPO | G06K 9/00 |
| WO 93/23824 | 11/1993 | WIPO | G06K 9/00 |
| WO 95/24691 | 9/1995 | WIPO | G06K 9/00 |
| WO 96/10800 | 4/1996 | WIPO | G06K 9/00 |

OTHER PUBLICATIONS

"Flash Memory Products—1996 Data Book/Handbook", Advanced Micro Devices, Sunnyvale CA.

"FlashLite™ Memory Cards", Catalog 296045, AMP Inc., Harrisburg PA, Jul. 1995.

"AMP PC Card Connectors", Catalog 65701, AMP Inc., Harrisburg PA, Sep. 1995.

*Primary Examiner*—Jose L. Couso
*Assistant Examiner*—Matthew C. Bella
*Attorney, Agent, or Firm*—Arnold White & Durkee

[57] ABSTRACT

An apparatus and method for loading software changes into a currency discrimination machine. In one embodiment, a flash card having a memory remotely programmed with a second software code is adapted to be removably electrically coupled to the currency discrimination machine. Insertion of the flash card causes the initial code in the resident memory of the machine to become erased and replaced with the second software code. The flash card may thereafter be removed from the machine and used to load software changes into other machines. In another embodiment, the flash card is adapted to be inserted and remain electrically coupled to the currency discrimination machine. Insertion of the flash card causes the machine to execute the second software code, but the initial code is not erased or replaced. Upon removal of the flash card, the machine does not retain the second software code but will revert to execution of the initial code.

17 Claims, 5 Drawing Sheets

SOFTWARE LOADING SYSTEM FOR A CURRENCY SCANNER

FIELD OF THE INVENTION

The present invention relates generally to the field of currency handling machines and, more particularly, to a method and apparatus that permits quick and efficient loading of software or software upgrades into currency handling machines.

BACKGROUND OF THE INVENTION

A variety of techniques and apparatus have been used to satisfy the requirements of automated currency handling machines. At the upper end of sophistication in this area of technology are machines which are capable of rapidly identifying, discriminating and counting multiple currency denominations. This type of currency discrimination machine typically employs either magnetic sensing or optical sensing for discriminating between different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical characteristics with pre-stored parameters for different currency denominations, while accounting for adequate tolerances reflecting differences among bills of a given denomination. An example of a currency handling machine using an optical scanning technique is described in U.S. Pat. No. 5,295,196, issued Mar. 15, 1994 to Raterman et al. and assigned to Cummins-Allison Corporation, incorporated herein by reference.

Whether employing magnetic or optical sensing techniques, currency handling machines known in the art typically include a system memory for storing operating parameters including control software and the optical or magnetic characteristics of the different currency denominations to be evaluated. Although these parameters may remain fixed for relatively long periods of time, they must be updated periodically in order to reflect the most recent control software or optical or magnetic characteristics of the various currency denominations to be evaluated. Currency handling machines heretofore known in the art have employed memory devices such as erasable programmable read only memory (EPROMs) for this purpose because they are unalterable by a user but are capable of being erased and electrically reprogrammed.

However, in order to erase an EPROM chip, it must be removed from its position within the machine and exposed to an ultraviolet light for about 20 minutes. Because EPROM chips are sensitive to mechanical and electrostatic damage, the removal, erase process, reprogramming and replacement of the chips can generally be accomplished only by trained service personnel. In particular, mechanical damage to the chip is likely to occur during the removal process unless special tools are used to pry the chip from its socket within the machine. Once removed from the machine, EPROM chips are typically shipped to an off-site service center to be erased. Because of their sensitivity to damage, they must be shipped in special containers to protect them from mechanical and electrostatic damage. The chips are erased and reprogrammed at the service center and delivered to the customer, where they are reinstalled in the machines by trained service personnel.

Accordingly, there is a need for a software loading system that enables users of currency discrimination machines to more quickly and easily update the system memory of their machines. The system should enable users to update their system software without any special training and without requiring trained service personnel to remove, erase, reprogram and replace the system memory from the machine. The present invention is directed to providing a software loading system for a currency discrimination machine that overcomes or at least reduces the effects of one or more of the problems set forth above.

SUMMARY OF THE INVENTION

In accordance with one aspect of the present invention, there is provided an apparatus and method for loading software into a currency discrimination machine. A resident memory within the machine contains an initial software code to be executed by the central processing unit. The resident memory may be housed in a ZIF-type socket or equivalent to facilitate installation and removal of the resident memory. The initial software code includes operational control software and a first set of master characteristic patterns corresponding to the different denominations of bills to be evaluated by the currency discrimination machine. A flash card remote from the machine is programmed with an updated software code including a second set of master characteristic patterns corresponding to updated parameters of the different denominations of bills to be evaluated. The flash card containing the updated software code is adapted to be removably plugged into the currency discrimination machine. In response to the flash card being plugged into the machine, the initial software code in the resident memory of the machine is erased and replaced with the updated software code from the flash card. When the flash card is subsequently removed from the machine, the resident memory retains the updated software code. The flash card may thereafter be plugged into and removed from a series of additional machines to upgrade the software of the additional machines.

In accordance with an alternate embodiment of the present invention, there is provided another method and apparatus for loading software into a currency discrimination machine. A resident memory within the machine contains an initial software code to be executed by the central processing unit. The resident memory may be housed in a ZIF-type socket or equivalent to facilitate installation and removal of the resident memory. The initial software code includes operational control software and a first set of master characteristic patterns corresponding to the different denominations of bills to be evaluated by the currency discrimination machine. A flash card remote from the machine is programmed with an updated software code including a second set of master characteristic patterns corresponding to updated parameters of the different denominations of bills to be evaluated. The flash card containing the updated software code is adapted to be plugged into the currency discrimination machine. In response to the flash card being plugged into the machine, the resident memory of the machine executes the updated software code from the flash card, but the initial software code is not erased or replaced. Upon removal of the flash card from the machine, the resident memory reverts to execution of the initial software code.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Figure 1:
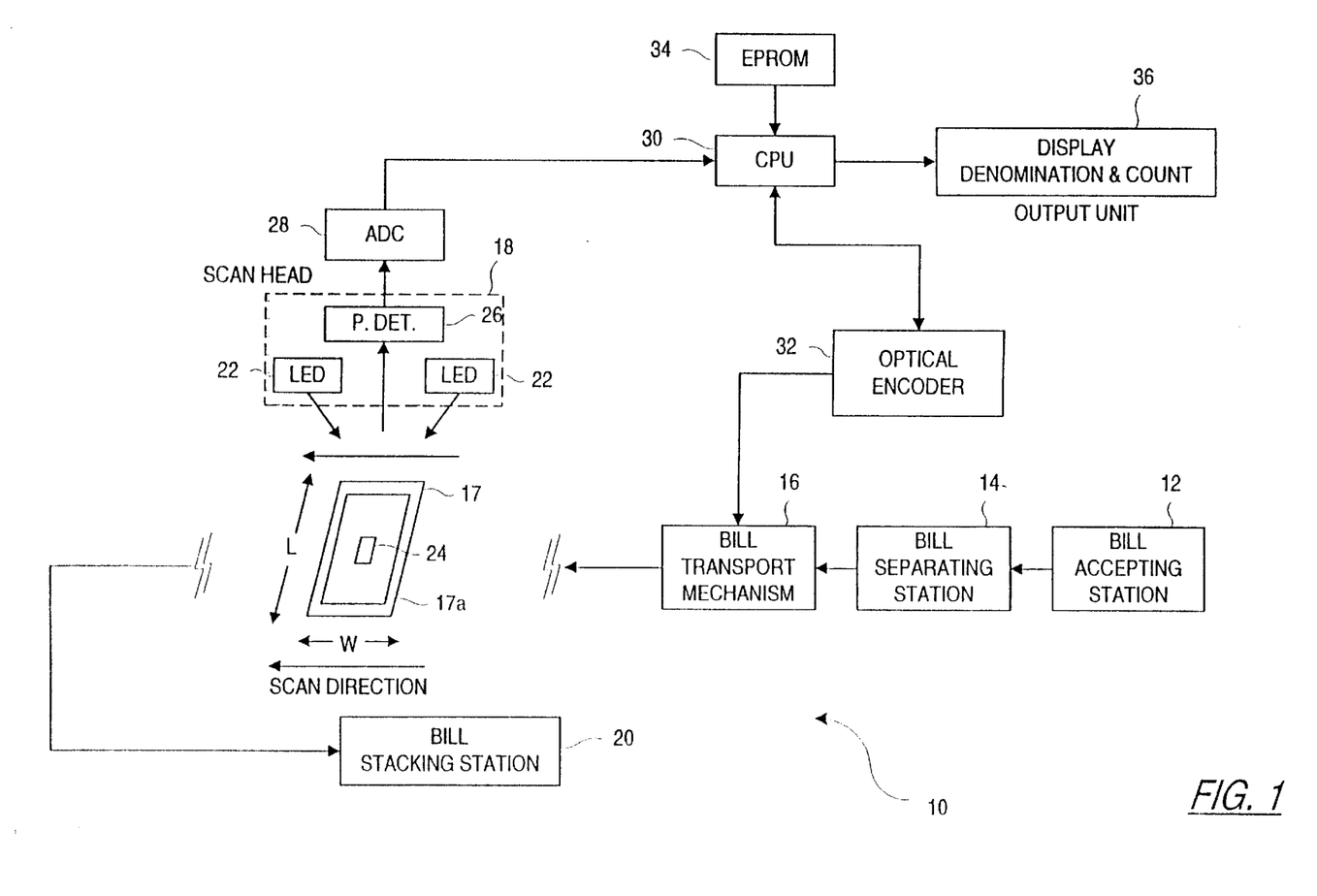
FIG. 1 is a block diagram of a prior art currency discrimination machine using an optical scan technique.

Turning now to the drawings and referring initially to FIG. 1, there is shown a functional block diagram illustrating the prior art currency discrimination machine disclosed in U.S. Pat. No. 5,295,196, issued to Raterman et al. and assigned to Cummins-Allison Corporation, incorporated herein by reference. The currency discrimination machine 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across an optical scanhead 18 where the currency denomination of the bill is scanned, identified and counted. The scanned bill is then transported to a bill stacking station 20 where bills so processed are stacked for subsequent removal. The scanhead 18 functions to detect light reflected from the bill as it moves across the illuminated light strip 24 and to provide an analog representation of the variation in light so reflected which, in turn, represents the variation in the dark and light content of the printed pattern or indicia on the surface of the bill. This variation in light reflected from the scanning of the bills serves as a measure for distinguishing among a plurality of currency denominations with a high degree of confidence.

A series of master characteristic patterns for each denomination of currency that is to be detected is stored within an EPROM 34 which serves as the system memory. When U.S. currency is to be detected, for example, characteristic patterns may be stored in the EPROM 34 representing the seven different denominations of U.S. currency, i.e. $1, $2, $5, $10, $20, $50 and $100. Additionally, several sets of characteristic patterns may be stored for each denomination of bill so that the currency discrimination machine is able to recognize the denomination of the bill in several orientations. When it becomes necessary to upgrade or update the master characteristic patterns, the EPROM chips are typically removed from the machine by skilled personnel and replaced with upgraded chips which have previously been erased and updated. The removed EPROM chips are thereafter sent to a service center to be erased by a process which includes exposure to ultraviolet light for about 20 minutes. After the EPROM chips are erased, they become available to be reprogrammed and reinstalled in other machines.

Once the master characteristic patterns have been stored, the pattern generated by scanning a bill under test is compared by the CPU 30 with each of the prestored master characteristic patterns to generate, for each comparison, a correlation number representing the extent of correlation of the bill with the characteristic patterns. The CPU 30 is programmed to identify the denomination of the scanned bill as corresponding to the highest degree of correlation with the stored characteristic patterns. Depending on the needs of the user, the currency discrimination machine 10 may be operated in either of several modes, including a mixed mode, a stranger mode, a sort mode, a face mode, and a forward/reverse orientation mode.

In the mixed mode, the currency discrimination machine 10 is designed to accept a stack of bills of mixed denomination, total the aggregate value of all the bills in the stack and display the aggregate value. Information regarding the number of bills of each individual denomination in a stack may also be stored in denomination counters.

In the stranger mode, the currency discrimination machine 10 is designed to accommodate a stack of bills all having the same denomination, such as a stack of $10 bills. The currency discrimination machine 10 will determine the denomination of the first bill in the stack and then flag any subsequent bills not having the same denomination. Alternatively, the stranger mode permits the operator to designate the denomination against which bills will be evaluated with those of a different denomination being flagged. Assuming the first bill in the stack determines the relevant denomination and assuming the first bill is a $10 bill, then provided al the bills in the stack are $10 bills, the currency discrimination machine 10 will indicate the aggregate value of the bills in the stack and/or the number of $10 bills in the stack. However, if a "stranger" bill having a denomination other than $10 is included in the stack, the discrimination machine 10 will temporarily stop evaluating the stack of bills. The stranger bill may then be removed from the machine and the machine restarted to evaluate the remainder of the stack of bills.

In the sort mode, the currency discrimination machine 10 is designed to accommodate a stack of bills wherein the bills are separated by denomination. For example, all the $1 bills may be placed at the beginning of the stack, followed by all the $5 bills, followed by all the $10 bills, etc. The operation of the sort mode is similar to that of the stranger mode in that the machine will temporarily stop evaluating the stack of bills upon detection of a different denomination bill, to permit the operator to remove the previously evaluated bills. For example, assuming the first bill in the stack determines the relevant denomination and assuming the first bill is a $1 bill, the discrimination machine 10 will process the bills in the stack until the first non-$1 bill is detected, which perhaps may be a first $5 bill. At this point, the discrimination machine 10 will temporarily stop evaluating the bills in the stack and may display the aggregate value or number of $1 bills. The operator may then place the stack of $1 bills in a separate stack apart from the other denominations of bills. The machine may thereafter be restarted to continue cycling through the remainder of the stack of bills and the above process is repeated upon the machine encountering different denominations of bills. Upon the completion of processing the entire stack, the machine may indicate the aggregate value of all the bills in the stack and/or the number of bills of each denomination in the stack.

In the face mode, the currency discrimination machine 10 is designed to accommodate a stack of bills all faced in the same direction, e.g. "face up" or "face down" and to detect any bills facing the opposite direction. In such a mode, the currency discrimination machine 10 will determine the face orientation of the first bill in the stack and flag subsequent bills if they do not have the same orientation. Alternatively, the discrimination machine 10 may be designed to permit designation of the face orientation to which bills will be evaluated with those having a different face orientation being flagged. Assuming the first bill in a stack determines the relevant face orientation and assuming the first bin is face up, then provided all the bills in the stack are face up, the machine will indicate the aggregate value of the bills in the stack and/or the number of bills of each denomination in the stack. However, if a bill faced in the opposite direction (i.e., face down in this example), is included in the stack, the discrimination machine 10 will temporarily stop evaluating the bills and permit the operator to remove the reverse-faced bill from the machine. The machine may thereafter be restarted to continue cycling through the remainder of the stack of bills until encountering other reverse-faced bills, upon which the above process is repeated. The ability to detect and correct for reverse-faced bills is important as the Federal Reserve Bank requires currency it receives to be faced in the same direction.

In the forward/reverse orientation mode ("orientation mode"), the currency discrimination machine 10 is designed to accommodate a stack of bills all oriented in a predetermined forward or reverse orientation direction. The forward direction may be defined as the direction in which the top edge of the bill is fed first into the machine, while the reverse direction may be defined as the direction in which the bottom edge of the bill is fed first into the machine. In such a mode, the currency discrimination machine 10 will determine the forward/reverse orientation of the first bill in the stack and flag subsequent bills if they do not have the same orientation. Alternatively, the discrimination machine 10 may be designed to permit the operator to designate the forward/reverse orientation against which bills will be evaluated with those having a different forward/reverse orientation being flagged. Assuming the first bill in a stack determines the relevant forward/reverse orientation and assuming the first bill is fed in the forward direction, then provided all the bills in the stack are also fed in the forward direction, the machine will indicate the aggregate value of the bills in the stack and/or the number of bills of each denomination in the stack. However, if a bill having the opposite forward/reverse direction is included in the stack, the discrimination machine 10 will temporarily stop evaluating the bills and permit the operator to remove the reverse-oriented bill from the machine. The machine may thereafter be restarted to continue cycling through the remainder of the stack of bills until encountering other opposite forward/reverse oriented bills, upon which the above process is repeated. The ability to detect and correct for reverse-oriented bills is important inasmuch as the Federal Reserve Bank may soon require currency it receives to be oriented in the same forward/reverse direction.

Figure 2:
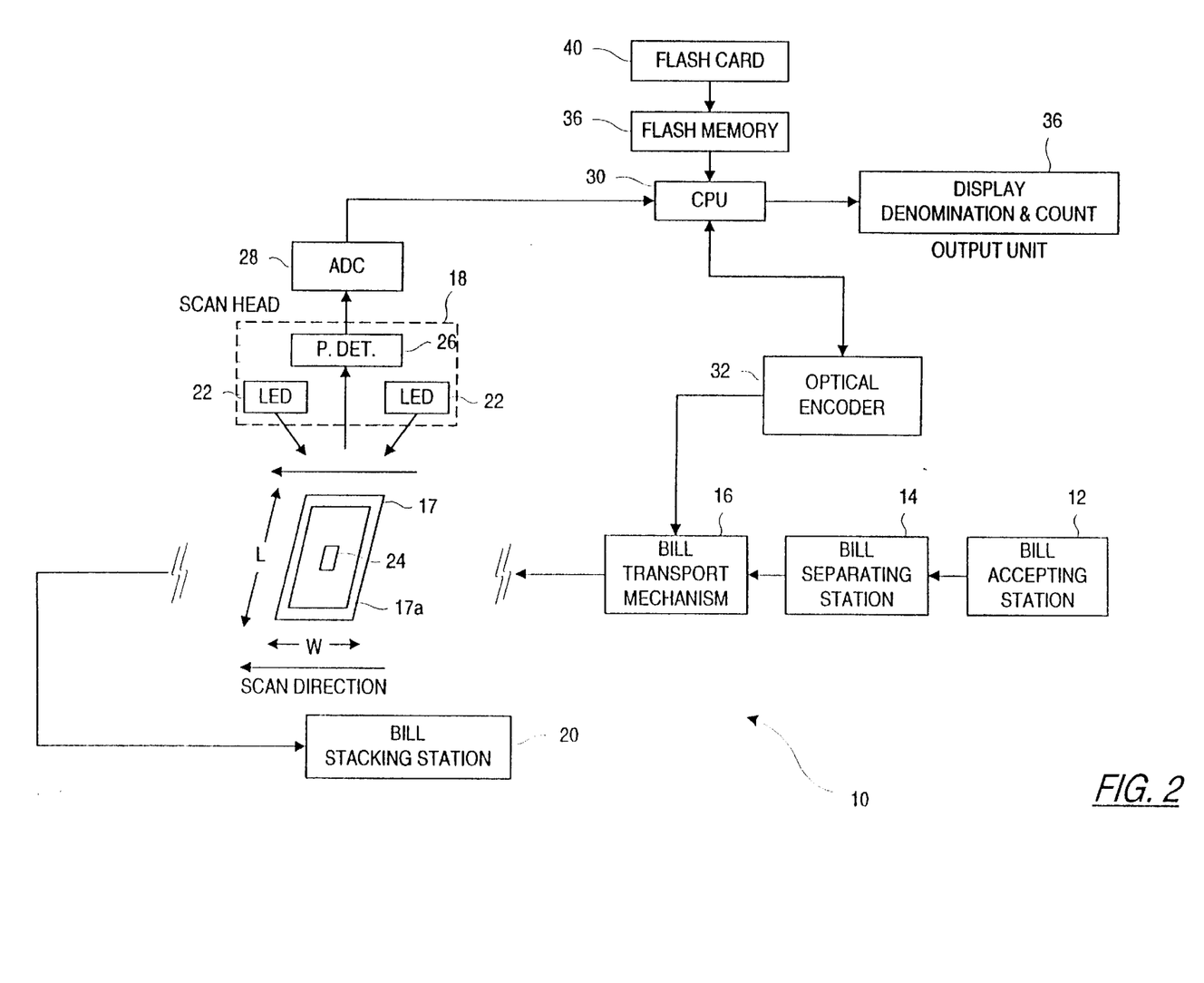
FIG. 2 is a block diagram of a currency discrimination machine having a software loading capability according to one embodiment of the present invention.

Turning now to FIG. 2, there is shown a representation, in block diagram form, of a currency discrimination machine in a preferred embodiment in which its resident memory is of the type known as a "flash memory" 36, which is capable of being rapidly erased and reprogrammed electrically. The electrical signals required to erase and reprogram the flash memory are provided by means of a flash card 40, which will be described in greater detail hereinafter. As will be appreciated by those skilled in the art, the resident memory need not be comprised of a flash memory but may be comprised of any of several alternative types of memorys known in the art, including electrically eraseable programmable read only memorys (EEPROMs) or random access memorys (RAMs). Nevertheless, flash memorys are preferred because they are nonvolatile (e.g. their data content is preserved without requiring connection to a power supply), they may be electrically erased and reprogrammed within fractions of a second by simply sending electrical control signals to the flash memory while it remains within the machine, and they are less expensive than EEPROMs. Preferably, the resident flash memory 36 will be electrically programmable in sectors so that portions of the memory can be erased and reprogrammed individually. An example of a specific type of flash memory which may be used in the currency discrimination machine is product number Am29F010, commercially available from Advanced Micro Devices, Inc. ("AMD") of Sunnyvale, Calif. and described in detail in AMD's publication entitled "Flash Memory Products—1996 Data Book/Handbook", incorporated herein by reference. However, those skilled in the art will appreciate that other types of flash memorys may be utilized, depending on the system memory requirements and desired operating characteristics.

For added flexibility, according to one embodiment of the present invention, means for quickly and easily installing or removing the resident memory from the currency discrimination machine may be provided. As can be appreciated by those skilled in the art, several devices may be utilize to accomplish this purpose. One solution is to house the resident memory chip in a zero insertion force ("ZIF") socket, in which movable contacts can be opened to facilitate insertion or removal of the memory chip in the socket without damaging the lead pins of the memory chip. Typically, the movable contacts of the ZIF socket may be opened by simply depressing a lever or button on the surface of the socket.

Although the embodiment described in relation to FIG. 2 utilizes a flash memory 36 as a resident memory, the resident memory of the currency discrimination machine may be comprised of any of several other types of memorys known in the art. The ZIF-type socket described above may be used in combination with any of these alternate types of resident memorys, and accordingly is not limited to use with a flash memory. Examples of ZIF-type sockets are disclosed in U.S. Pat. No. 5,342,213 ('213 patent), incorporated herein by reference and designated herein as FIGS. 3a and 3b, respectively.

Figure 3A:
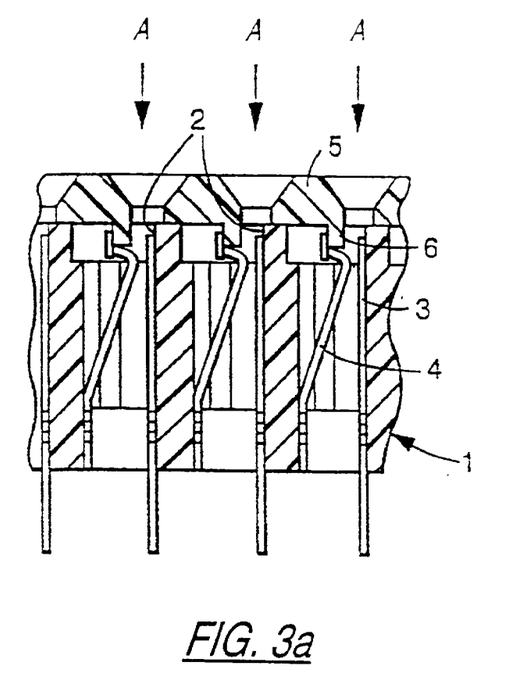
FIGS. 3a and 3b are cross sectional views of ZIF-type sockets which may be used to house the resident memory of the present invention.

FIG. 3a shows an example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts is made up of a first contact element 3 that is fixed and a second contact element 4 that is elastically deformable. Lead pins are inserted between the first and second contact elements 3 and 4, and then locked. An actuator 5 is installed to open or close the contacts. In the example shown in FIG. 3a, the actuator 5 is formed with a movable plate arranged on the surface of the socket body 1, and has engaging means 6 that engage with the tops of the second contact elements 4. When lead pins are inserted, the actuator 5 is moved left. Then, the second contact elements 4 are moved left accordingly. Thereby, openings are created between the second contact elements 4 and the first contact elements 3. The lead pins are inserted smoothly without being subject to applied force by the contacts. When the lead pins are inserted into the contacts, the actuator 5 is moved right. Then, the second contact members are moved right and reset to the original positions. Eventually, the lead pins are held between the first and second contact elements 3 and 4.

Figure 3B:
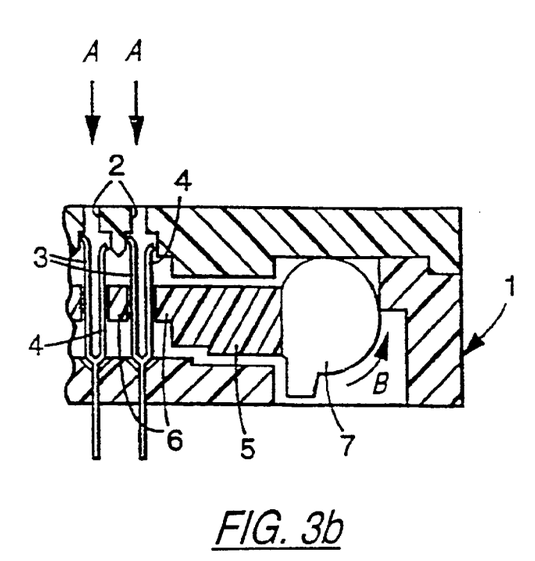

FIG. 3b shows another example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts includes a first contact element 3 that is fixed and a second contact element 4 that is elastically deformable. The lead pins are inserted and held between the first and second contact elements 3 and 4. An actuator 5 is provided to open or close the contacts. In the example shown in FIG. 3b, the actuator 5 is arranged inside the socket body 1 and includes an engaging means 6 for pressing the second contact elements 4 toward the first contact elements 3. The actuator 5 is pressed leftward by a cam 7. When lead pins are inserted, the actuator 5 lies at a position as illustrated. Openings are created between the second contact element 4 and the first contact elements 3. The lead pins are inserted smoothly without being subject to applied forces by the contacts. When the lead pins are inserted into the contacts, the cam 7 is rotated in the direction of arrow B to move the actuator 5 to the left. Then, the second contact elements 4 are moved toward the first contact elements 3. The lead pins are held between the first and second contact elements 3 and 4. In FIGS. 3a and 3b, the first and second contact elements 3 and 4 are connected to a circuit board.

Figure 4:
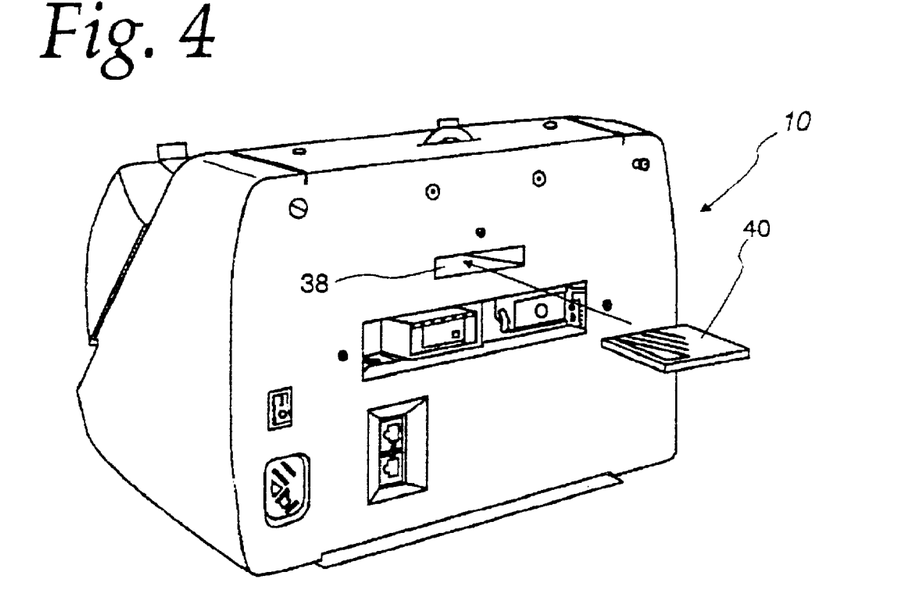
FIG. 4 is an isometric view depicting the insertion of a flash card into an external slot on a currency discrimination machine according to one embodiment of the present invention.

Referring now to FIG. 4, there is depicted a currency discrimination machine 10 having an external slot 38 for receiving a flash card according to one embodiment of the invention. A removable flash card 40 is adapted to be inserted by a user through the external slot 38 and into a mating socket 42 located inside the machine adjacent the slot 38. Upon insertion of the flash card 40 into the socket 42, an electrical connection is formed between the flash card 40 and the resident memory, which preferably is a flash memory 36. As will be appreciated by those skilled in the art, the flash card 40 may be electrically coupled to the resident memory by any of several alternative means other than a socket. The flash card 40 contains its own memory which is adapted to be pre-programmed with updated software reflecting, for example, the most recent magnetic or optical characteristics of the currency denominations to be evaluated, the most recent operating code for the currency discrimination machine 10, or an operating code associated with one of the modes of operation of the currency discrimination machine 10 described in relation to FIG. 1. Similar to the resident memory, the flash card memory need not be a flash memory but may be comprised of any of several other types of memorys known in the art, including electrically eraseable programmable read only memorys (EEPROMs) or one-time programmable read-only memorys. Nevertheless, a flash memory is preferred because it offers a high degree of versatility at a relatively low cost.

The flash card 40 should be small and lightweight, sturdy enough to withstand multiple uses, and adapted to be easily insertable into the slot 40 and corresponding socket 42 of the currency discrimination machine 10 by users not having any special training. Further, the flash card 40 should not require any special electrostatic or physical protection to protect it from damage during shipping and handling. One type of flash card that has been found to satisfy these criteria is the FlashLite™ Memory Card available from AMP, Inc. of Harrisburg, Pa. However, it is envisioned that other suitable types of flash cards will become available from other manufacturers. The FlashLite™ card has a thickness of 3.3 mm (⅛ inch), a width of approximately 45 mm (1.8 inches) and a 68-pin connector interface compatible with the Personal Computer Memory Card International Association (PCMCIA) industry standards. Its length may be varied to suit the needs of the user. In one embodiment, two sizes of flashcards (designated "half size" and "full size") have lengths of 2.1 inches (53 mm) and 3.3 inches (84 mm), respectively, but other sizes of flash cards may also be utilized.

Figure 5:
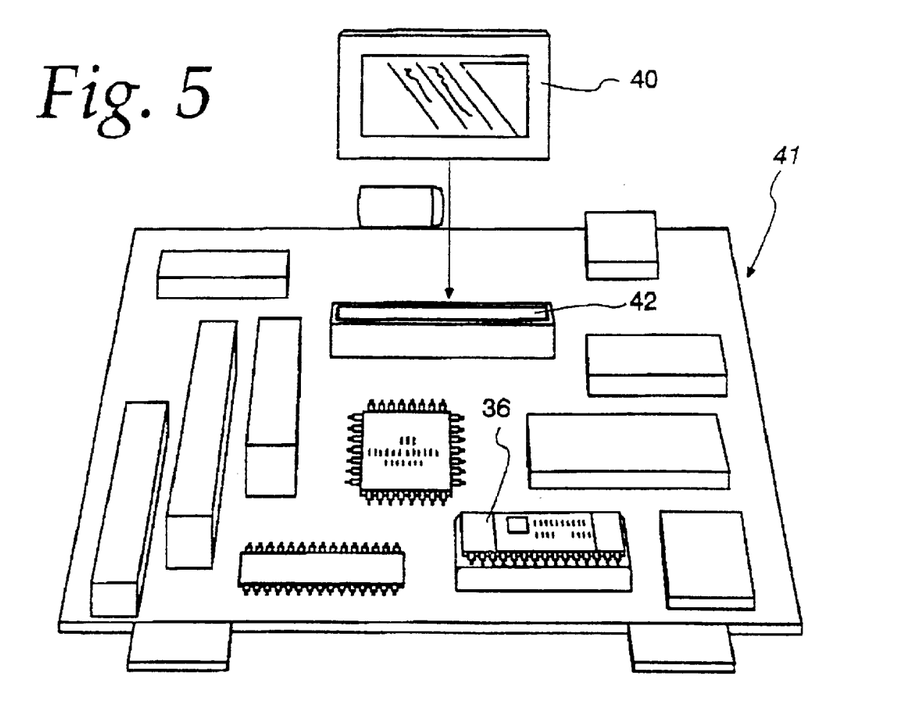
FIG. 5 is an isometric view depicting a socket for accepting a flash card according to one embodiment of the present invention.

Turning now to FIG. 5, there is depicted a circuit board assembly 41 including a socket 42 adapted to receive the flash card 40 according to one embodiment of the invention. Upon insertion of the flash card 40 into the socket 42, electrical signals are communicated from the flash card 40 to the resident memory of the machine. In one embodiment, the socket 42 comprises a PCMCIA-compatible 68-position receptacle for receiving a flash card such as the FlashLite™ card described above. One type of socket that may be used for this purpose is AMP, Inc. product number 146773-1, which is adapted to extend vertically from the circuit board assembly 41 within the currency discrimination machine 10. However, it will be appreciated by those skilled in the art that other types of sockets may be utilized, including those positioned horizontally in relation to the circuit board assembly 41, or those including a lever or button which may be depressed to eject the flash card 40 from the socket 42.

Upon insertion of the flash card 40 into its socket 42, the CPU 30 is capable of electrically detecting the presence of the card. If the FlashLite™ card is used, this is accomplished by means of two specially designated connector pins $CD_1$ and $CD_2$ (assigned to pin numbers 36 and 67, respectively) being shorted to ground. The CPU 30 then compares the contents of the flash card memory with the contents of the resident flash memory 36. If the contents of the memorys are the same, an audible or visual message is provided to the user indicating that the process is concluded. If the contents of the memorys are different, the required sectors in the resident flash memory 36 are erased and the new code is copied from the flash card 40 to the resident flash memory 36. Upon successful completion of the memory transfer, an audible or visual message is provided to the user indicating that the process is concluded. The flash card 40 can thereafter be removed from the currency discrimination machine 10 and plugged into any other currency discrimination machine requiring a software update. In the event of an unsuccessful memory transfer, the machine will automatically re-attempt the transfer until, after multiple unsuccessful attempts, the user will be advised that there is a hard system failure and to call for service. Optionally, the flash card 40 may include a counter for limiting the number of times that a given flash card may be copied into the resident flash memory of additional machines. For example, the flash card 40 may include a cycle count byte which is preset to a designated number and decrements upon each copy cycle.

Figure 6:
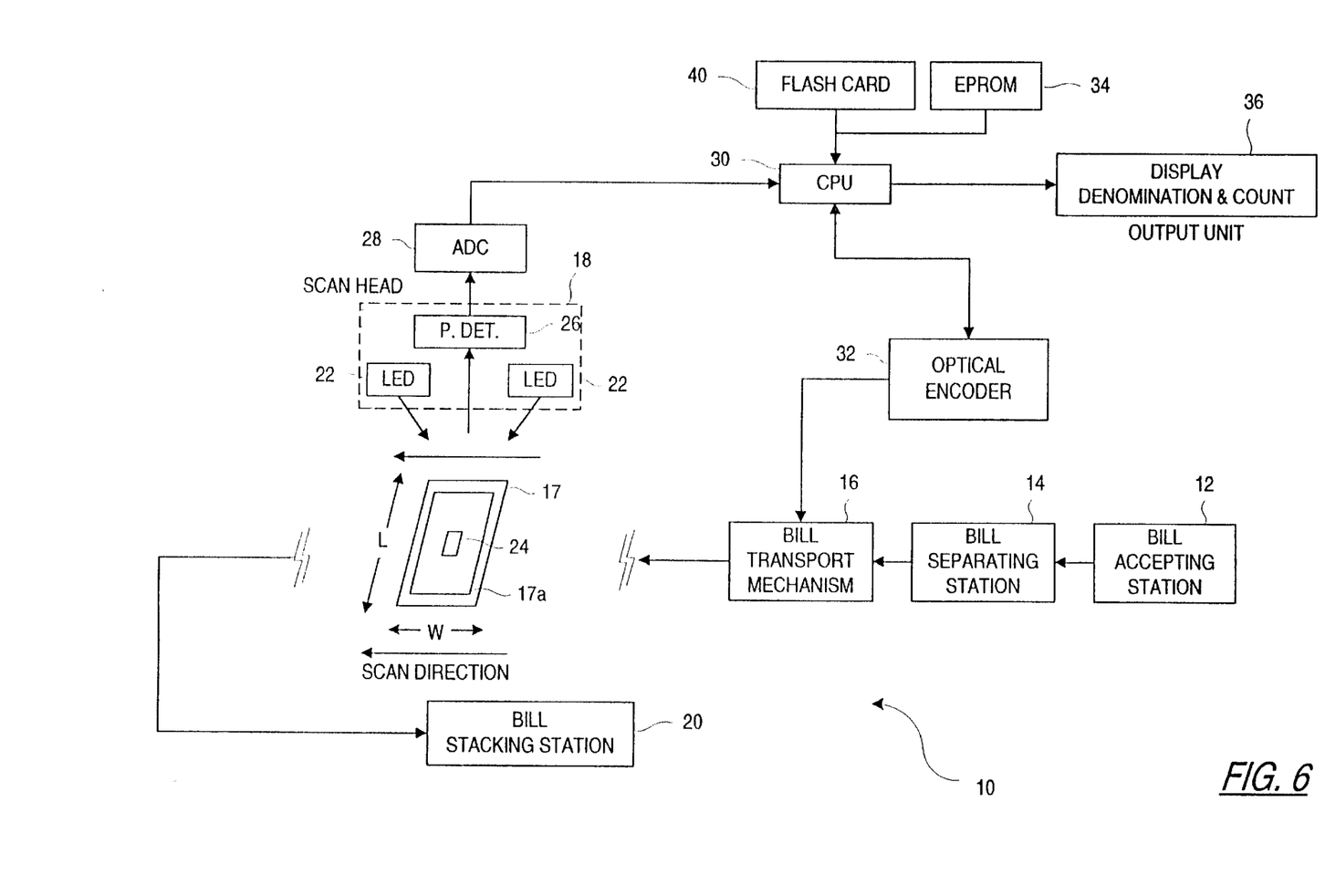
FIG. 6 is a block diagram of a currency discrimination machine having a software loading capability according to another embodiment of the present invention.

Referring now to FIG. 6, there is shown a block diagram of an alternate embodiment of a software loading system for a currency discrimination machine. In this embodiment, the currency discrimination machine 10 contains a resident memory 34 which is not a flash memory. In the embodiment shown, the resident memory is an EPROM, but it may be comprised of alternate types of non-flash memorys. The currency discimination machine 10 is provided with a socket 42 adapted to receive a flash card 40 therein substantially as described above. Upon insertion of a flash card 40 into the socket 42, the CPU 30 electrically detects the presence of the card as described in relation to FIG. 5, and thereafter executes the code directly from the flash card memory as long as the flash card 40 remains inserted in the socket 42. If the flash card 40 were to be removed from the socket 42, the CPU 30 would revert to executing the old code from the resident memory 34. In this embodiment, because the flash card 40 must remain inserted in the socket 42 in order to execute the updated code, each currency discrimination machine 10 must be equipped with its own dedicated flash card 40.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A software loading system for a currency discrimination machine having a central processing unit for evaluating a stack of currency bills, said software loading system comprising:

a resident memory containing an initial software code to be executed by the central processing unit, said initial software code including a first set of master characteristic patterns corresponding to the bills to be evaluated by said currency discrimination machine; and a flash card having a flash card memory containing a second software code, said second software code including a second set of master characteristic patterns corresponding to the bills to be evaluated by said currency discrimination machine, said flash card being adapted to be removably electrically coupled to the currency discrimination machine, said resident memory being adapted to erase the initial software code and store the second software code in response to the flash card being electrically coupled to the currency discrimination machine, said resident memory being adapted to retain the second software code in response to the flash card being thereafter removed from the currency discrimination machine.

2. The software loading system of claim 1 wherein said resident memory comprises a flash memory.

3. The software loading system of claim 1 wherein said flash card memory comprises a flash memory.

4. The software loading system of claim 1 wherein said resident memory is housed within a ZIF socket.

5. A software loading system for a plurality of currency discrimination machines each having a central processing unit for evaluating a stack of currency bills, each of the machines having a resident memory containing an initial software code to be executed by the central processing unit in evaluating the currency bills, the software loading system comprising:

a flash card having a flash card memory containing a second software code, the flash card being electrically coupled to and removed from a number of the machines to accomplish a number of software changes, the flash card memory including a counter for limiting the number of software changes said flash card may accomplish, each of the software changes accomplished by the flash card causing the resident memory of one of the machines to erase the initial software code and store the second software code.

6. The software loading system of claim 5 wherein the resident memory in each of the currency discrimination machines comprises a flash memory.

7. The software loading system of claim 5 wherein said flash card memory comprises a flash memory.

8. The software loading system of claim 5 wherein the resident memory in each of the currency discrimination machines is housed within a ZIF socket.

9. The software loading system of claim 5 wherein the initial software code in each of the currency discrimination machines includes a first set of master characteristic patterns corresponding to the bills to be evaluated by the respective currency discrimination machines and the second software code includes a second set of master characteristic patterns corresponding to the bills to be evaluated by the respective currency discrimination machines.

10. A method of loading software changes into a currency discrimination machine having a central processing unit for evaluating a stack of currency bills, said currency discrimination machine having a resident memory containing an initial software code to be executed by said central processing unit, said initial software code including a first set of master characteristic patterns corresponding to the bills to be evaluated by said currency discrimination machine, said method of loading software upgrades comprising the steps of:

storing a second software code in a flash card memory contained within a flash card remote from said currency discrimination machine, said second software code including a second set of master characteristic patterns corresponding to the bills to be evaluated by said currency discrimination machine;

electrically coupling said flash card to the currency discrimination machine to cause said resident memory to erase the initial software code and store the second software code; and removing said flash card from the currency discrimination machine, said resident memory of said currency discrimination thereafter retaining the second software code.

11. The method of loading software changes of claim 10 wherein the steps of electrically coupling and removing said flash card are repeated on a plurality of additional currency discrimination machines to accomplish a number of additional software changes.

12. The method of loading software changes of claim 11 further comprising the step of limiting the number of additional software changes that may be accomplished by said flash card.

13. A software loading system for a currency discrimination machine having a central processing unit for evaluating a stack of currency bills, said software loading system comprising:

a resident memory containing an initial software code to be executed by the central processing unit, said initial software code including a first set of master characteristic patterns corresponding to the bills to be evaluated by said currency discrimination machine; and a flash card having a flash card memory containing a second software code, said second software code including a second set of master characteristic patterns corresponding to the bills to be evaluated by said currency discrimination machine, said flash card being adapted to be removably electrically coupled to the currency discrimination machine, said central processing unit being adapted to execute said second software code in response to the flash card being electrically coupled to the currency discrimination machine, said central processing unit being adapted to execute said initial software code in response to the flash card being thereafter removed from the currency discrimination machine.

14. The software loading system of claim 13 wherein said flash card memory comprises a flash memory.

15. The software loading system of claim 13 wherein said resident memory is housed within a ZIF socket.

16. The software loading system of claim 15 wherein said flash card memory comprises a flash memory.

17. A method of loading software changes in a currency discrimination machine having a central processing unit for evaluating a stack of currency bills, said currency discrimination machine having a resident memory containing an initial software code to be executed by said central processing unit, said initial software code including a first set of master characteristic patterns corresponding to the bills to be evaluated by said currency discrimination machine, said method of loading software changes into the currency discrimination machine comprising the steps of:

storing a second software code in a flash card memory contained within a flash card remote from said currency discrimination machine, said second software code including a second set of master characteristic patterns corresponding to the bills to be evaluated by said currency discrimination machine; and electrically coupling said flash card into the currency discrimination machine to cause said central processing unit to execute said second software code.

* * * * *